United States Patent [19]

Schwartzman

[11] Patent Number: 4,458,645
[45] Date of Patent: Jul. 10, 1984

[54] FORCE ACTUATED LATCHING DEVICE AND HIGH PRESSURE SYSTEM

[76] Inventor: Everett H. Schwartzman, 2751 Toledo St., Torrance, Calif. 90503

[21] Appl. No.: 957,718

[22] Filed: Nov. 6, 1978

[51] Int. Cl.³ .................. F02D 7/00; F15B 15/22
[52] U.S. Cl. .................................. 123/378; 92/14; 123/396; 123/505
[58] Field of Search ............ 123/97 R, 103 R, 103 E, 123/139 BG, 140 A, 140 FG, 198 A, 505, 378, 396; 92/14, 15

[56] References Cited

U.S. PATENT DOCUMENTS 2,603,191  7/1952  Sterrett .................................. 92/15
3,135,171  6/1964  Michalak .............................. 92/14
4,143,631  3/1979  Stumpp .............................. 123/103 R
4,170,960  10/1979  Germack et al. ............... 123/198 A Primary Examiner—Craig R. Feinberg
Attorney, Agent, or Firm—Beehler, Pavitt, Siegemund, Jagger & Martella

[57] ABSTRACT

A force operated latching device for use with a switch, valve or motor includes a sleeve-piston combination responsive to the force and which is latched and delatched in response to the force, usually in the form of fluid pressure. The latching device may be incorporated into a manifold for control of internal combustion engine.

11 Claims, 11 Drawing Figures

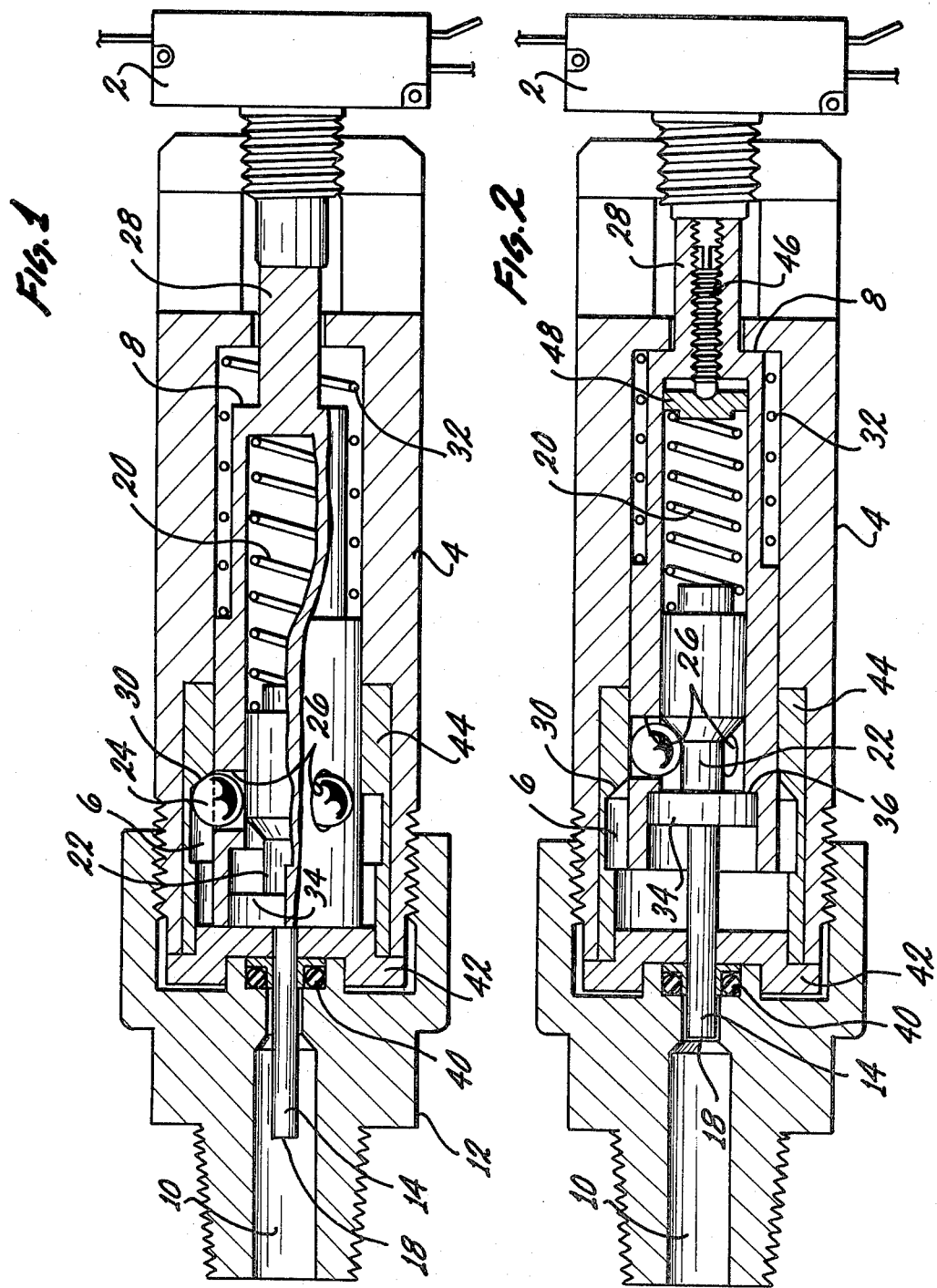

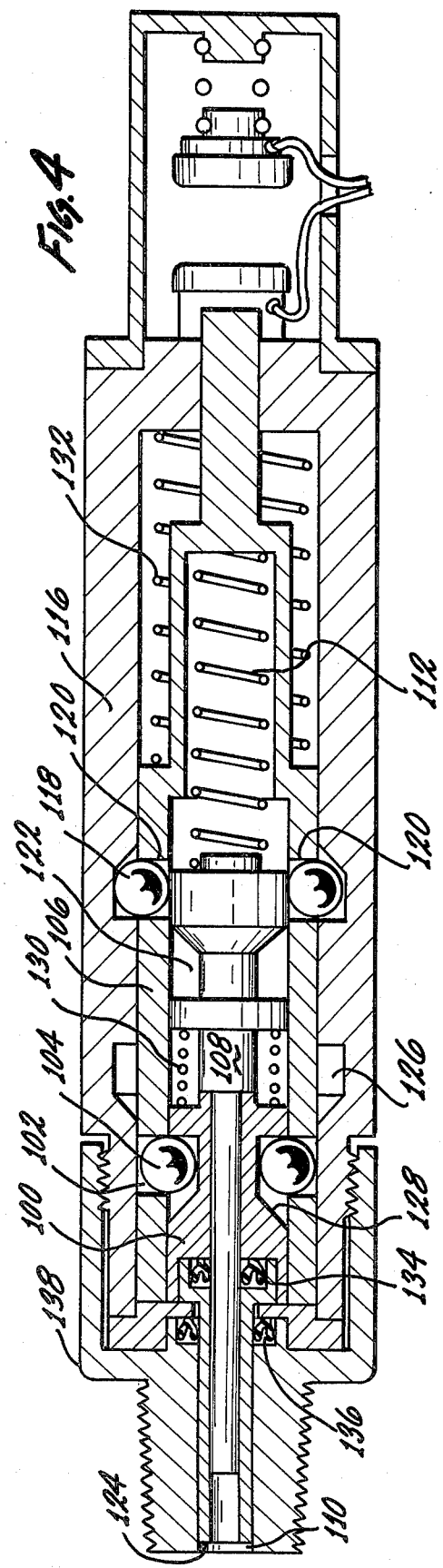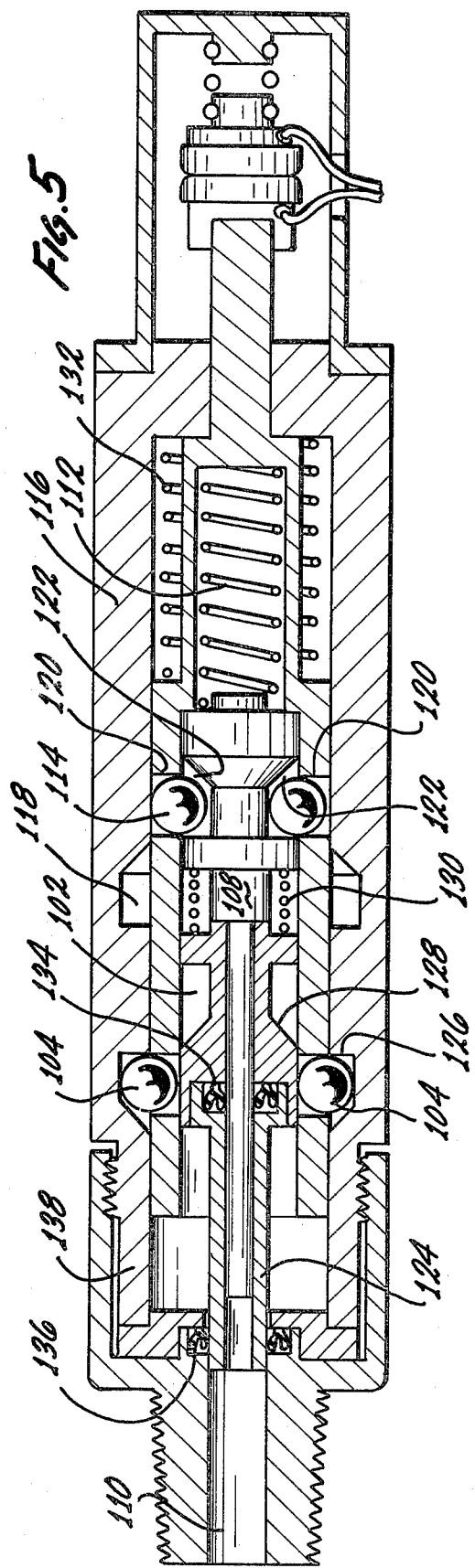

FORCE ACTUATED LATCHING DEVICE AND HIGH PRESSURE SYSTEM

BACKGROUND OF THE INVENTION

The present invention relates to pressure or force operated latching mechanisms and high pressure systems using the same. More particularly, the present invention relates to an improved latching device which actuates an electrical switch, or valve, or an engine throttle, at a given pressure or force level, and which deactivates at another and different and independent pressure force level, or visa versa, and to high pressure systems using such latching devices.

There are many engineering applications where it is necessary to provide a pressure or force responsive device which operates and is responsive at two different pressure or force levels to control another device such as a valve, or an engine throttle, or an electrical switch, for example. One typical such application is in high pressure spray systems where a motor operates a pump to provide the high pressure. In such a system as long as the spray or stream is being generated, the pump is operated by the motor to maintain the desired pressure level. When the spray or stream is no longer being dispensed, it is desirable to run the pump only until a desired pressure level is reached and thereafter, when the sprayer is operated, to actuate the pump to provide the proper spray pressure This may also be accomplished by actuating a by-pass valve when the system pressure exceeds a predetermined value and deactivates the by-pass valve when the pressure is below a certain level. Another typical application of the improved latching mechanism of the present invention is in the control of air compressors driven by an electrical motor or some other power source. By way of example, an air compressor for producing "shop air" would normally include a tank holding air at about 150 psig. As air is used from the tank and the pressure reduced to about 60 psig, for example, the compressor is operated to bring the tank pressure back up to 150 psig at which time the compressor, usually motor driven, is turned off.

Heretofore, it has been difficult to obtain the desired control of such a pressure system, within two different pressure levels for a start-stop sequence, by the use of the common type of pressure switch employing a non-linear element such as a Bellville spring. This is especially true where there is a wide range between start or cut-on and stop or cut-off, since the operating range of a Bellville type of spring operated device is limited.

By contrast, the latching device of the present invention affords an unlimited range between the desired cut-on and cut-off levels, by the use of a common type of coil spring, and thus does not rely upon the limited range of operation normally associated with non-linear mechanical elements normally used in conventional pressure or force actuated devices of the prior art.

Another advantage of the present invention is that the length of the stroke may be made quite long without unduly complicating the design or affecting performance of the device. This unique characteristic of the device of this invention makes it relatively simple to design a latching mechanism to operate the levers and-/or throttle valve of an internal combustion engine. Thus, where an internal combustion engine is used to drive a pump or compressor, the latching mechanism of this invention may be used both to control the throttle setting of the engine and to operate a fluid control valve. In situations requiring an intermittent demand, once the required pressure level is reached, the latching mechanism of this invention actuates a bypass valve thus preventing an excessive pressure build-up and simultaneously throttles back the engine to an idling position. This mode of operation prevents excessive build-up of heat in the pump fluid and also reduces engergy consumption by allowing the internal combustion engine to idle during the no load phase.

SUMMARY OF THE INVENTION

The present invention, relating to a latching device and a pressure system using such a device, includes a unique latching mechanism for positive control at two independent force or pressure levels.

The first pressure level is such as to activate the device while the second pressure level is such as to deactivate the device, or visa versa. Each activation set point is completely independent of the other and therefore an essentially unlimited force or pressure range as between activation and deactivation may be obtained. Accordingly, the present invention not only allows for two independent set points but also allows for a very long stroke apparatus, an apparatus which is desirable in applications such as throttle valve controls, large through flow valve control and pumping applications. This invention may also be used in conjunction with a signal generated by the difference between two pressure levels and is easily adapted to both extremely high as well as extremely low pressure levels.

A BRIEF DESCRIPTION OF THE DRAWINGS

A better understanding of the invention may be obtained by reference to the following description taken in connection with the accompanying drawings in which:

FIG. 1 is a cross sectional view partly in elevation, of a device in accordance with the present invention illustrating the device in its deactivated position and operating an external electrical switch;

FIG. 2 is a cross sectional view partly in elevation, of the device of FIG. 1 showing it in the activated position and operating the external switch, this figure also showing an adjustment for setting or varying the operating point of the device;

FIG. 4 is a view partly in section and partly in elevation of another device in accordance with the present invention illustrating a double latching mode operating with an integral electrical switch showing the switch in the open position;

FIG. 5 is similar to FIG. 4 showing the switch in the closed position;

Figure 10:
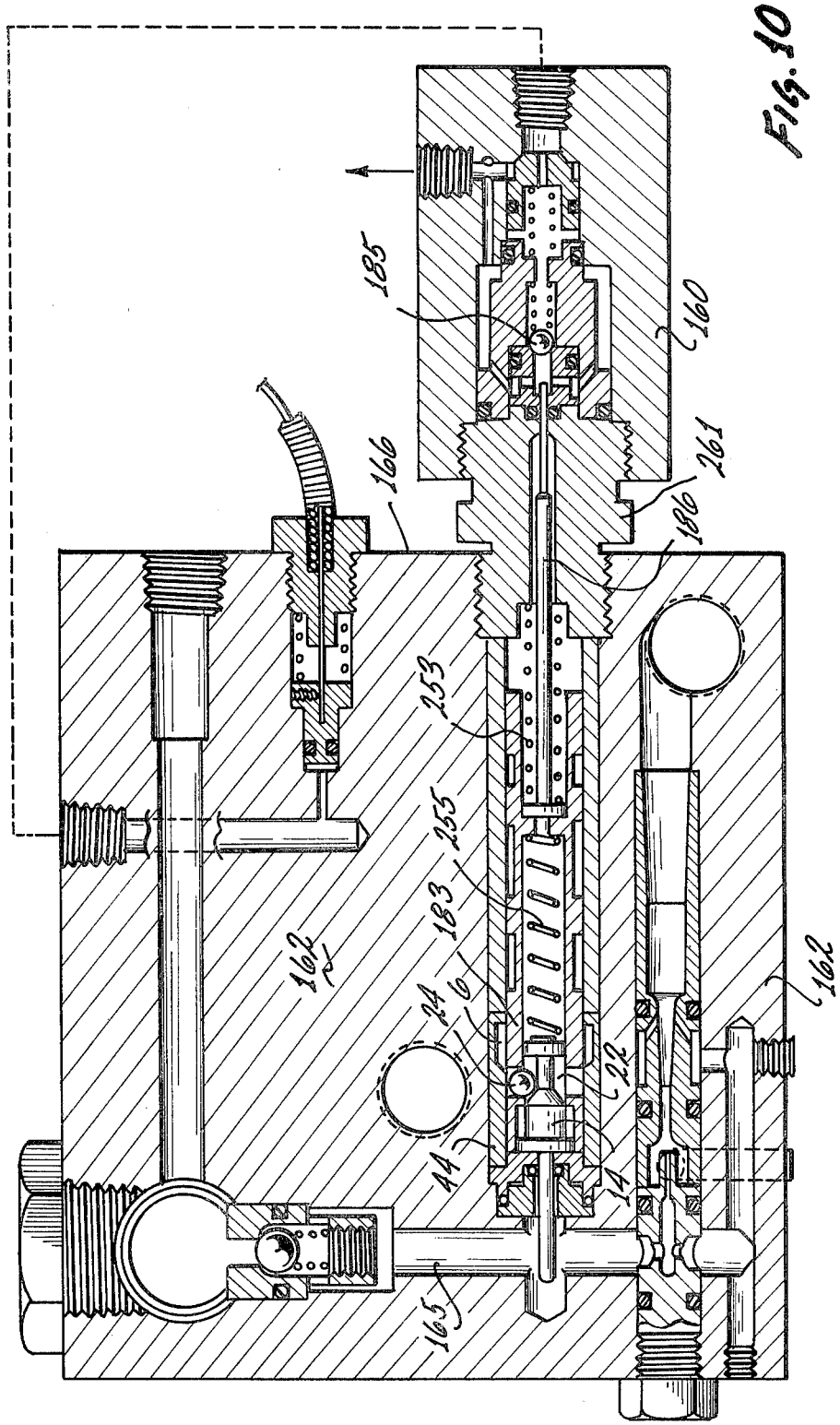
Figure 11:
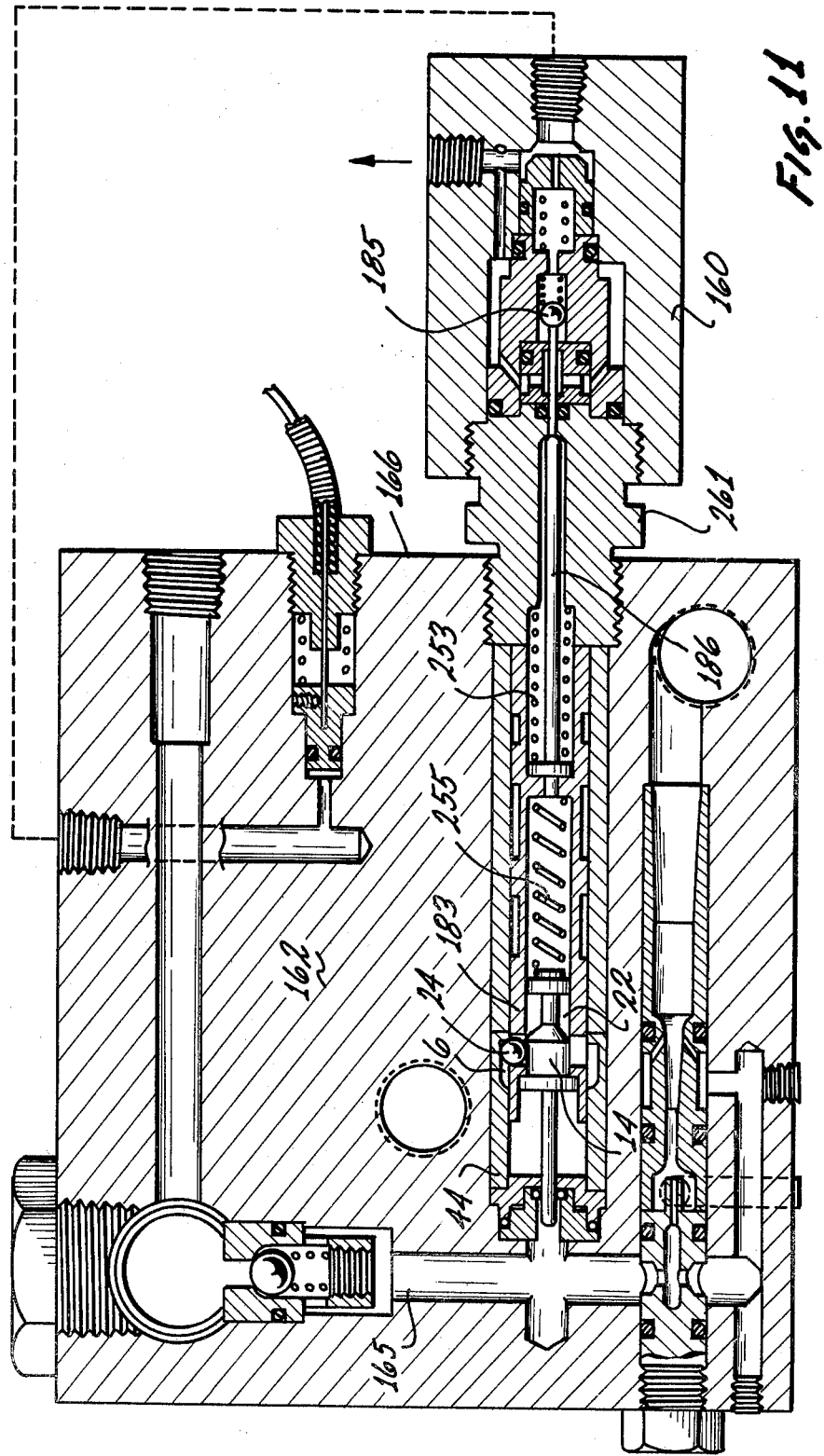

FIG. 10 is a view partly in section and partly in elevation of a latching device of the present invention used in a manifold used in controlling a bypass valve in which the manifold contains ancillary means for throttle control for an internal combustion engine and which incorporates an ejector by which an additive may be used with a high pressure pump, this view also illustrating the latching operating in a reverse mode from that previously described whereby the mechanism slowly opens and snaps shut and is shown in a closed mode; and FIG. 11 is the same as that shown in FIG. 10 except that the latching mechanism is shown in the bypass open mode.

DETAILED DESCRIPTION OF THE INVENTION

Figure 3:
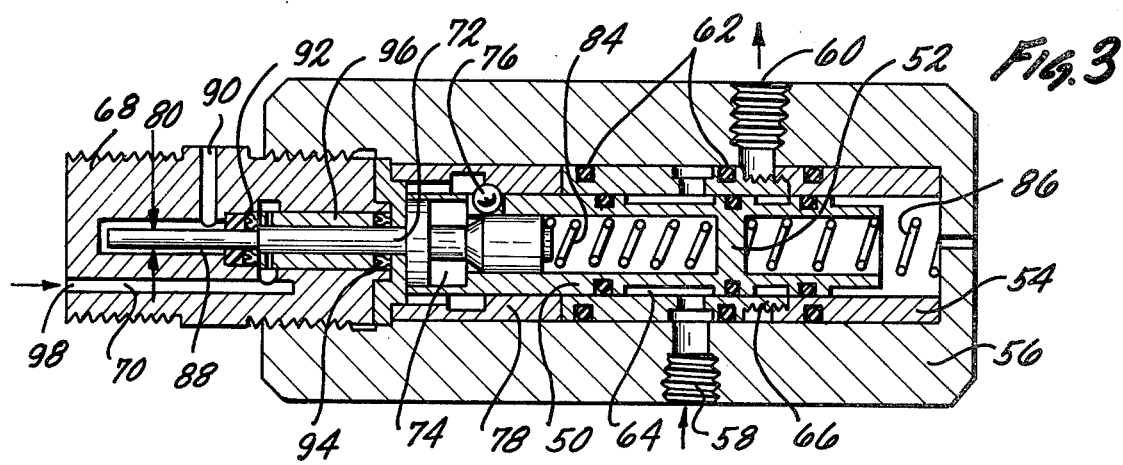
FIG. 3 is a view partly in section and partly in elevation of another form of the device of the present invention used as a fluid control valve in which the device of the present invention has been combined with a control valve, this view illustrating a device of the invention using a difference in areas thereby making it suitable for use in high pressure applications.

Referring to FIG. 1 which illustrates a preferred form of the present invention, a typical force or pressure actuated device is illustrated in conjunction with an electrical switch 2, FIG. 1 illustrating the mechanism in its low force or low force or low pressure (deactivated) mode, while FIG. 2 shows the mechanism in its high force or pressure mode (activiated) mode. It should be apparent to those skilled in the art that the terms "activated" and "deactivated" are relative terms and in actuality the operating sequence may be reversed if so desired by each specific application. For example, FIG. 3 shows the mechanism which operates either an electrical switch or valve in the opposite mode from the mode of the device illustrated in FIGS. 1 and 2, that is, activation occurs at a lower relative pressure than that used with the devices of FIGS. 1 and 2.

With reference to the embodiment illustrated in FIGS. 1 and 2, the body of which is generally cylindrical includes an internal recess 6 at one end thereof to provide a positive latching means which prevents a sleeve 8 positioned within the body from actuating the electrical switch 2 until the desired force or pressure is obtained. The desired force is obtained from the pressure of the fluid which enters a passageway 10 provided in cap 12, the latter being screwed to the threaded end of the body as illustrated. The pressure in passage 10 acts on a cylindrical portion of 14 of a piston generally designated as 16. The desired force is created on piston 16 by the pressure of the fluid acting on the face 18 of the end of the cylindrical portion 14. This force is biased by a spring 20, in the form of a helical spring, acting counter to the pressure force on piston 16.

The piston 16 is provided with a recess 22 machined in it. With reference to FIG. 1 it can be seen that the sleeve 8 is locked in its relative position to body 4 by spheres 24 and thereby actuation of the switch 2 is prevented until the piston 16 is moved by the force created by the fluid pressure against the bias of spring 20. The movement of piston 16 in response to the pressure and against the bias of the spring 20 continues until the recess 22 in the piston is in such a relative position with respect to the spheres 24 as to allow the spheres to become disengaged from the recess 6 by moving into the recess 22 contained in the piston 16.

Sleeve 8 has corresponding apertures 26 drilled therein perpendicular to the axis of the sleeve.

As can be seen with reference to FIGS. 1 and 2, port 26 contains the sphere 24, and there is usually a plurality of spheres 24 and corresponding apertures 26 equally spaced radially around one end of the sleeve 8. The dimensioned thickness of the sleeve 8 at the portions where the spheres 24 are contained, such that the major diameter of the sphere 24 is always in contact with the sleeve 8 regardless of the radial position of the sphere 24.

By way of a more detailed description of the locking mode performed by the engagement sphere 24, it can be seen with reference to FIG. 1 that the spheres 24 are in their respective most outward radial position thus firmly engaging the sleeve 8 in a locked relative position with respect to the body 4. It can be seen that the sleeve 8 cannot actuate the switch to via the stem 28 until the position of piston 16 is as shown in FIG. 2 were in the spheres 24 are forced by the inclined surface 30 into their most inward radial position. When the spheres 24 are in the position as shown in FIG. 2, the spheres disengage the sleeve 8 from the body 4 so that the sleeve 8 is permitted to move and thus actuate the switch 2, the stem 28 being joined to move with the sleeve 8, and in the form shown is integral with the sleeve. The point or force of disengagement occurs when the force acting on the piston 16 at the surface 18 is such as to allow the piston 16 to move against the bias spring 20 to such a position as illustrated in FIG. 2 whereby the spheres 24 move into recess 22 contained in the piston 16 thus releasing the sleeve from the body 4. The strength of the spring 20 controls the desired set point of release.

The previously described unique latching mode of operation of the present invention can be further analyzed as follows. When the device is in the position as shown in FIG. 1, the acuating sleeve is locked in its relative position to the body 4. The actuating force occuring on surface 18 of piston 16 is not transmitted through the sleeve 8 since the actuating force is transmitted indirectly to the body 4 via the spheres 24 and the recess 6. This force is transmitted via the piston 16 to the bias spring 20, the bias spring 20 in turn being compressed and exerting a correspoding reacting force on the actuating sleeve 8, which itself is latched into the body 4. Thus, all of the actuating force is transmitted to the body 4. In essence in the position of the parts as shown in FIG. 1, all of the applied force at point 18 is transmitted via spring 20 to the body 4. Once the position of the relative parts as depicted in FIG. 2 is reached and the sleeve 8 has become disengaged from the body, all of the forces are transmitted to a bias means 32. Since the sleeve 8 has become disengaged from the body 4, the sleeve 8 contacting the piston 16 is free to move so as to actuate the switch 2. The biasing means, spring 32, is located between the body and the sleeve 8 and is supported on a shoulder formed on the sleeve and controls the amount of force or pressure required to deactivate the switch 2.

In the system illustrated in FIGS. 1 and 2 the spring 32 produces a lower force than produced by spring 20 the difference between the force of spring 20 and the force 32 being the means of achieving the force difference or pressure difference for actuation and deactuation of the swtich 2. It should be noted that FIG. 1 illustrates the actuating sleeve 8 locked into the body 4, while FIG. 2 illustrates the actuating sleeve locked into the piston 16. Thus from FIG. 1 it can be seen that piston 16 acts only relative to sleeve 8, while from FIG. 2 it can be seen that both piston 16 and the sleeve 8 are dependent and act jointly relative to the body 4. This transfer of locking, that is, sleeve 8 to body 4 and then sleeve to piston 16, allows for the transfer of biasing force as between the springs 20 and 32, respectively. The phenomena of transfer of a biasing force is the means by which the actuating force or pressure and the deactuating force or pressure are independent of each other and is controlled by the strength or the free loading of the spring 20 for the actuating force and by spring 32 for the deactuation, respectively.

With reference to FIG. 2 as the pressure within the passageway 10 decreases and there is in turn a decrease in force on the cylinder 14, the decrease in pressure allows the spring 32 to return the sleeve 8 and the locked-in piston 16 to the original deactivated position as shown in FIG. 1. When this occurs the relative position as between the spheres 24 and with respect to the recess 6 body 4 move outward against the inclined surface 30 contained in the body 4 and which forms one surface of the recess 6. This motion ensures that a positive deactivation position is always reached.

The piston 16 has as one surface of the recess 22 a portion of a short cylinder 34 whose outer diameter is such as to afford a shoulder for a positive stop as between piston 16 and sleeve 8 at point 36. Likewise sleeve 8 has a cylindrical recess of such dimensions as to accept the cylinder 34 of the piston 16, the recess of being of ample length to allow for the desired relative motion as required between the piston 16 and the sleeve 8. The positive stop prevents any over-loading of the spring 20 even when the pressure acting on the cylinder 14, which is an integral part of piston 16, becomes excessive. A seal 40 is provided within the cap 12 which seals around the cylinder 14 of the piston 16 to prevent any of the fluid in conduit 10 from leaking into the interior mechanism of the device. Element 42 operates as a retainer and retains the seal 40 and itself is made secure by the body 4 clamping it between the cap 12. The body 4 is screwed into the cap 12 which provides the clamping action.

As illustrated in FIG. 2 the body 4 may be made out of a soft material such as plastic or aluminum in which case it may contain a hard insert 44 which could provide the necessary recesses 6 to contain the spheres 24 during the operation of the device. FIG. 2 also shows a means for providing the desired adjustment so that a variable actuation pressure or force may be obtained. Such means is provided by adjusting screw 46 which is threaded into the sleeve 8. A spring base 48 is utilized to maintain the spring 20 and in proper relation to the sleeve as determined by the relative position of the adjusting screw 28 within the sleeve 8.

Referring to FIG. 3 of the drawing, there is illustrated a device similar to the one shown in FIGS. 1 and 2, but which operates as a pressure or force actuated latching device to operate a fluid control valve rather than an electrical switch. The latching and return mechanism is the same as that described in FIGS. 1 and 2. However, a sleeve 50 also serves as a spool for a fluid control valve 52. The valve 52 includes a cyclinder 54 contained within a body 56 which also includes an inlet port 58 and an outlet port 60. As shown in FIG. 3, pressurized fluid is maintained by o-rings or seals 62 in the spool recess 64. Upon actuation of the device the spool 50 is forced to the right as seen in the drawing, so that the fluid ports 66 are uncovered by the seal 62 allowing the fluid to pass from the inlet port 58 through or around spool 50 and to exit out of the outlet port 60.

The actuating fluid enters the cap 68 via channel 70 and acts on piston 72. The piston 72 includes a recess 74 for providing the space required for the actuation and deactivation via the spheres 76 in combination with the body insert 78 and the sleeve as previously described.

In the structure of FIG. 3, the activating fluid acts on the piston 72 by creating a force caused by the fluid acting on an area difference created by utilizing different cylinder diameters 80 and 82, respectively. In this manner reasonable forces can be maintained so as not to require abnormally large springs 84 and 86, respectively. For example, if the dimensions of diameter 80 and 82, were equal no force would be generated regardless of how high the pressure of the activating fluid. Thus, by controlling the respective ratio of diameters 80 and 82, different pressure ranges may be accommodated without the necessity of resorting to an abnormally large (stiff) springs. The area as generated by diameter is made effective by venting the region 88 via a vent port 90. Seals 92 and 92 seal and maintain the actuating fluid between the respective diameters 80 and 82. Sleeve 96 maintains seal 94 within the cap 68. If actuating fluid entering port 98 is connected to the inlet port 58 of the fluid control valve 52 the device will act as a pressure relief valve. The relief pressure is controlled by spring 84 while the shut off pressure is controlled by spring 86, thus a pressure relief valve is constructed which has a relief pressure independent of the shut off pressure obtained by the use of the two different springs 84 and 86 respectively and functioning as described in FIGS. 1 and 2.

The device as described in FIG. 3 may be used as a primary control device in many pneumatic and liquid fluid systems to perform desired fluid control functions such as a pilot valve for bypass valve, throttle control and the like.

In the form of device, in accordance with the present invention, illustrated in FIGS. 4 and 5, a pressure or force actuation and deactuation device have both a positive actuation latching means and a positive deactuation means is illustrated. These figures also show an internal built-in electrical switching means as an alternative to an external switch means as shown in FIGS. 1 and 2.

FIG. 4 shows a latching device in a deactivated state while FIG. 5 shows the device in a activation state. First activation piston 100 has a recess 102 in which spheres 104 are retained in a position with respect to the sleeve 106 so as to lock to the sleeve 106 as illustrated in FIG. 4. Fluid pressure acting on a second actuation piston 108, which is conducted to the piston via inlet duct 110 causes a force on piston 108 which moves the piston against the first set spring 112. As illustrated in FIG. 4, sleeve 106 has a rear set of latching spheres 114 which lock the sleeve 106 to the body 116 by being maintained in the groove 118 and the holes 120 provided in the sleeve 106. The force acting on piston 108 causes the piston to move against the spring 112 until the spheres can disengage from the body 116 by moving into the recess 122 contained in the piston 108 whereupon 108 becomes locked into the sleeve 106 (FIG. 5). In this sequence the force acting on the piston is transferred wholly to sleeve 106 causing it to move and initate either contact with the switching means shown in FIG. 5 or as an alternative to actuate a fluid control valve as illustrated previously in FIG. 3. The force acting on the area 124 of the end of the piston 100 also helps to move the sleeve 106 and the piston 108 against the set-point bias means in the form of the spring 112 until the spheres 104 contained in the recess 120, which is integral with the piston 100, are aligned with the groove 126 contained in the body 116. Thereafter the spheres lock the sleeves 106 in its respective actuation position by being forced by the inclined surface 128 of the recess 102 into the recess 126 contained in the body 116. The set point spring 112 controls the pressure point at which the device will become actuated, so as either to make an electrical contact or actuate a fluid control valve. FIG. 5 shows sleeve 106 in a locked position in the actuation mode. The locked condition is controlled by piston 100, spheres 104 and contained in groove 126 and the body 116.

As the pressure and or force created thereby decrease the piston moves towards the left, as seen in the drawing by the force created by bias means of 130. The spring 130 controls the set point at which the device will become deactivated. This will occur when the groove 102 contained in the piston 100 becomes aligned with the recess 126 contained in the body 116 so as to allow the spheres 104 to release the sleeve 106 from the body 116. Return sleeve spring 132 allows the sleeve to return to the position as shown in FIG. 4 whereupon spheres 114 will lock sleeve 106 in its deactivated position relative to body 116. Seals 132 and 136 prevent fluid leakage as between piston 108 and 100 and piston 100 and cap 138, respectively.

Figure 6:
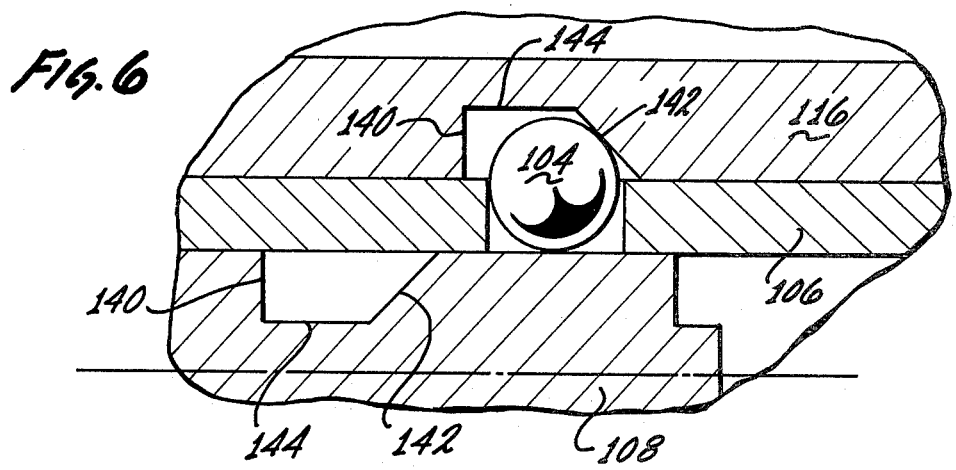
FIG. 6 is an enlarged fragmentary view of a portion of the device shown in FIGS. 4 and 5 illustrating the details of construction of the latching device.

As can be seen in the various figures each recess such as those contained in the body 116, and shown in detail in FIG. 6 is generated by one surface 140 perpendicular to the axis of revolution of the device, one surface 142 inclined to the axis of revolution, i.e., a comical surface of revolution and connected respectively to a cyclindrical surface 144. The inclined surface 142 is such as to impart a force vector so as to cause the sphere 104 to move in a radial direction. The inclined surface on the recesses in the body 116 with respect to its counterpart of incline surfaces of recessess contained in piston 100 and 108 are such as to impart the desired radial forces required to lock and to release the locking means, i.e. spheres 104 and 114, during each mode or position as previously described. In all instance, the described spheres are retained in the sleeve 106 by virtue of the fact that the radial thickness of the sleeve is such as to ensure the major diameter of the spheres always within the region of the sleeve 106 generated by the thickness of the sleeve regardless of whether the sphere is in its outermost or innermost radial position.

Figure 7:
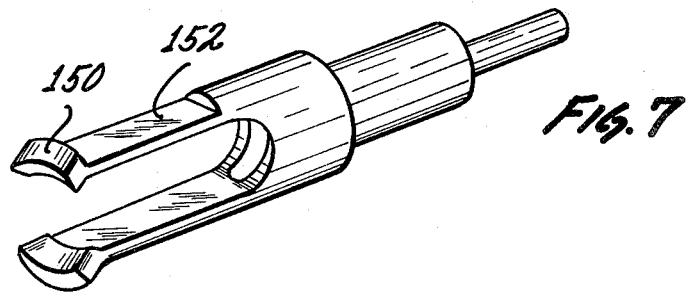
FIG. 7 is a view in perspective showing an alternative form of latching mechanism in accordance with the present invention.
Figure 8:
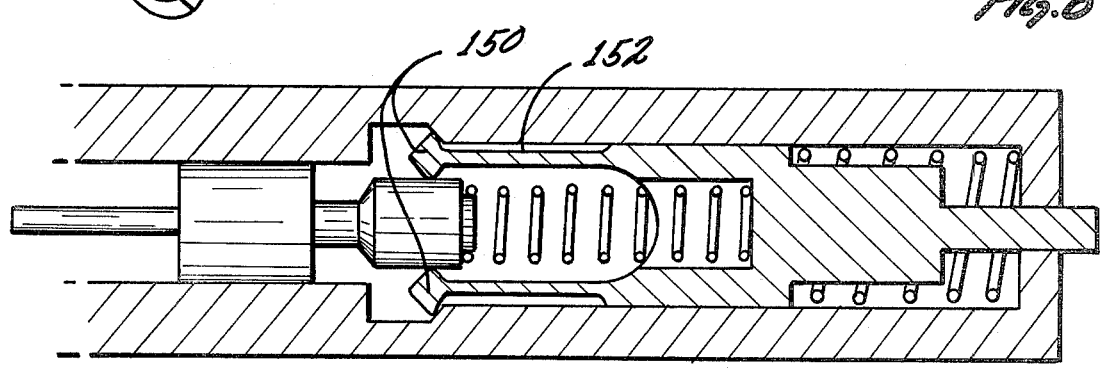
FIG. 8 is a cross sectional view of a device in accordance with the present invention illustrating the alternate latching means of FIG. 7 in conjunction with a complete device in accordance with this invention.

FIGS. 7 and 8 are an illustration showing an alternate locking device. In this form of locking device the previously mentioned spheres are replaced by integral spring locking lugs 150 machined as part of the sleeve 152. All modes of operation are identical to those previously described. The advantage of the design illustrated in FIGS. 7 and 8 is that a much larger surface area is provided by the locking lugs 150 when they are in contact with the respective inclined surfaces in the associated recesses, i.e. either these contained in the body or those recesses contained in the actuation piston, dependent upon which mode of operation the device is in.

Figure 9:
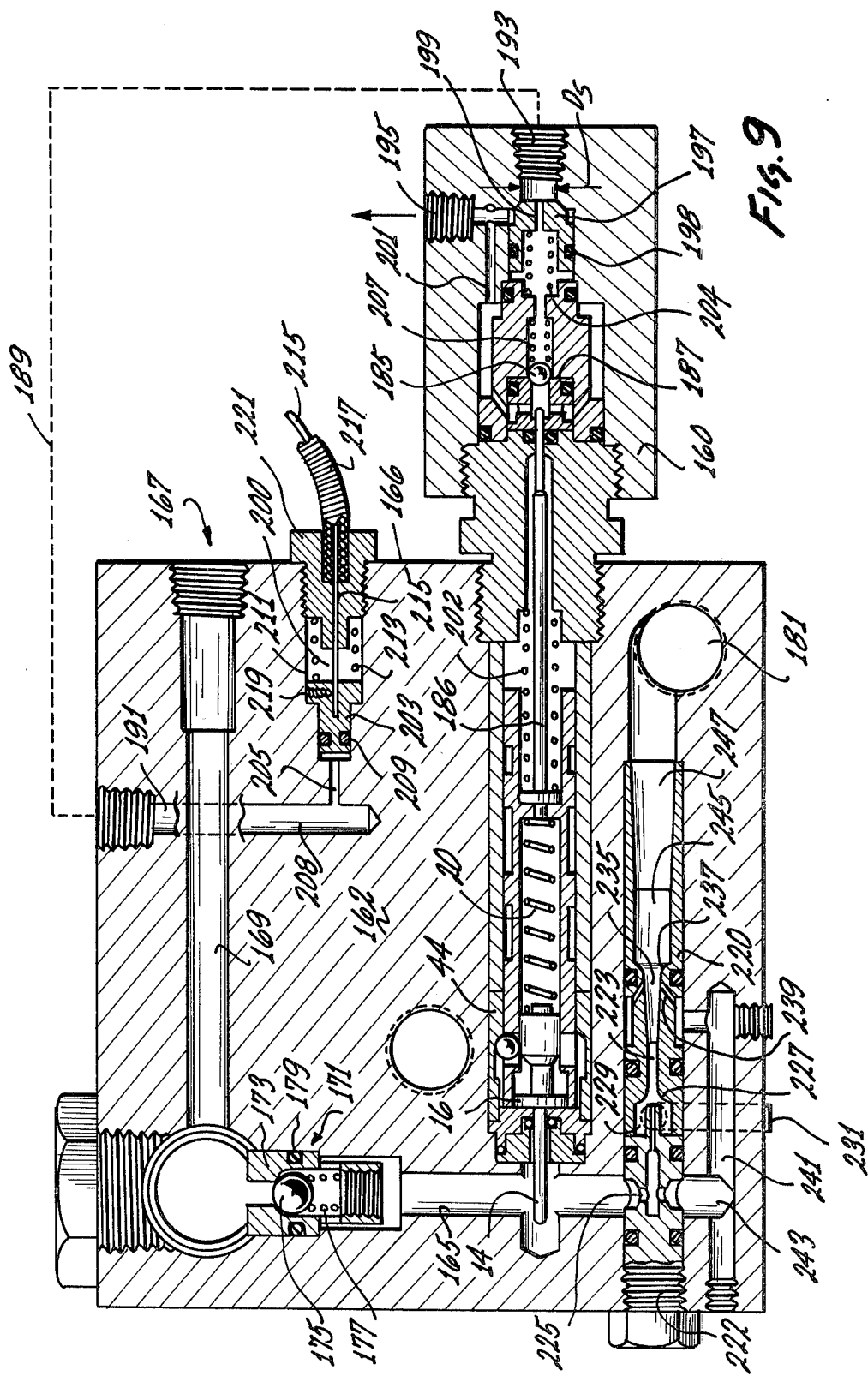
FIG. 9 is a drawing, partly in section and partly in elevation, of the latching device in accordance with the present invention used in a somewhat different form than that previously shown as a bypass valve contained in a manifold system for operating and controlling a gasoline or diesel power system.

Referring now to FIG. 9 there is illustrated the previously described mechanism in a mode used to actuate a bypass valve 160. The locking mechanism has the same reference numerals as those used in FIG. 2 since the mode of operation is identical with that as described in FIG. 2. The locking mechanism is contained in a manifold 162 and is actuted by the pressure in passage 165. This manifold is used in conjunction with an internal combustion engine driving a high pressure pump. The output of the pump enters the manifold block 166 at point 167 and travels, down passage 169 across a check valve 171. Check valve 171 is comprised of seat 173, ball check 175, ball check spring 177, the seat 173 being sealed between the manifold block 166 by an o-ring 179. The function of the check valve is to maintain pressure in the manifold until there is a demand for high pressure output which exits from the manifold at port 181. At the high pressure set point, the high pressure actuates piston 14 which in turn activates sleeve 183. Sleeve 183 is similar in design and functions in the same manner as that described in FIG. 2 for sleeve 8.

The sleeve 183 transmits its driving force to actuator pin 186 which lifts ball 185 off its seat 187. The bypass valve 160 is designed so that at the high pressure set point it will allow the pump to bypass all of the output flow of the pump through the manifold via passage 189. In this mode, fluid coming from the pump enters the manifold at 167 and flows through passage 169 until it enters and flows through passage 191 and is transported via pipe 189 to the bypass valve inlet port 193.

The fluid then exhausts from the bypass valve through port 195 where it can either return to the pump inlet or be diverted to any other desirable location. Main control piston 197 for the bypass valve has a small orifice or hole 199 through it so that the high pressure fluid tends to flow through said orifice and exert pressure on the back side of the piston 197 thus keeping it closed.

The effective high pressure area on the backside of piston 197 is larger than the corresponding high pressure on the front side of piston 197 by virtue of the fact that the seating diameter Ds is smaller than the outside diameter of the sealing surface of piston 197. Sealing or an effective seal is provided by a sealing element 198 contained in the piston and prevents high pressure fluid in back of the piston from leaking past to the low pressure by-pass port 195. Once the ball 185 has been activated (pushed off its seat in part 187), the high pressure in back of the piston 197 is able to flow past the ball through passages 201 to the by-pass exhaust port 195. Since the through flow area past the ball is larger than the orifice 199 when the ball 185 is open, the pressure behind the piston will be relieved so that the fluid from pipe 189, upon entering by-pass valve 193, will open piston 197 thus by-passing the fluid to port 195.

When the pressure decreases due to the flow through the opening of the by-pass valve to its designed low pressure set point, spring 202 will drive sleeve 183 back to its locked position, and, at the same time, allow ball 185 to reseat itself on the seat contained in part 187. When ball 185 has closed off the passage through seat 187, the fluid entering piston 197 through port 199 will pressurize the backside of the piston 197 and thus, this created force in conjunction with the spring force exerted by spring 204 will cause piston 197 to close and thus prevent any fluid from being by-passed through the manifold via the by-pass valve 160.

Spring 207 ensures that the ball will seat properly upon the reseating of drive sleeve 183. The size and pre-load of drive sleeve spring 202 determines the low pressure set-point of the mechanism, i.e. the pressure level at which point the by-pass valve closes. The high pressure set-point is the pressure level at which point the by-pass valve opens and is controlled by spring 20. In essence, the pressure activated mechanism in conjunction with the ball valve (187 and 185) act as the pilot valve for opening the main piston 197 of the by-pass valve. Thus, the characteristics of the pressure activated mechanism, i.e. high pressure and low set-points are also exhibited by the by-pass valve.

In this particular form of the invention the throttle mechanism 200 is included as an integral device contained within the manifold block 166. The throttle control is actuated by an intermediate pressure acting on piston 203 through port orifice 205 which is interconnected to the output pressure 167 of the pump through passage 208. The piston 203 is sealed within the manifold block 166 by seal 209 which can be an o-ring or Telfon filed spring bonded type seal element. The piston is free to travel to cylinder 211 contained in manifold block 166. The piston 203 is biased by return spring 213 and actuates the cable 215 contained in an outer sheath 217. The cable 215 in outer sheath 217 is known generically as a "flexible cable". The inner cable 215 is attached to the piston 203 by set screw 219 or other suitable means, the outer sheath 217 being contained in a cap 221 which also pre-loads the spring 213 and which is screwed into the manifold block 166 thus containing both spring and piston within the manifold block.

When the by-pass valve is in the open position, that is, the output fluid of the pump enters the manifold 162 at inlet port 167, the fluid is by-passed through pipe 189 and through by-pass valve 160 exhausting from port 195 tending to prevent any undue build-up of pressure, the spring 213 is such that it's preload is sufficient to keep piston 203 in the position as illustrated, that is, the leftmost position. Under this condition the throttle valve of the internal combustion engine is maintained in an idle position. When the by-pass valve 160 is closed, the pump will start to pressurize the system thus forcing piston 203 to the right, as viewed in the drawing, to cause an opening of the throttle of the internal combustion engine with the result that the engine will operate at full power. When the intended high pressure set point is reached, the bypass valve will be open by the previously described actuation mechanism causing the reduction of pressure in the system so that spring 213 will push the piston towards the left thus causing the throttle of the valve of the engine to close and shift to the idle position. The function of the just described throttle control valve is to conserve engine fuel by allowing the engine to idle when the bypass valve is open. When the high pressure fluid output is required, the throttle control valve will open the engine throttle by cable 215 so as to provide a full power operating condition.

In the form of invention shown in FIG. 9, the manifold 162 also contains an ejector 220 contained within the manifold block 166. The ejector 220 as shown is in the form of a 2-stage ejector (in many applications a single stage ejector may be sufficient) which is utilized to pump soap, solvent, chemicals and the like, into the high pressure output stream exiting from the manifold at 181. Element 222 is the first stage primary nozzle at 181. The high pressure fluid contained in passage 165 enters the first stage nozzle at 225 and flows out through 227 at a very high velocity and low pressure, that is, the nozzle converts the low pressure fluid contained in passage 165 from a high pressure to a high velocity at the corresponding low pressure according to the well known Bernoulli equation, i.e. conservation of energy for an incompressible fluid. Due the the low pressure created in chamber 229 by the nozzle, the previously described additives (solvent, soap, chemicals and the like) are caused to flow through check valve 231 into the chamber 229 where it is ejected through the ejector mixing section 223 and into a primary diffuser 235. The fluid in mixing section 233 and diffuser 235 is composed of the pump fluid plus the additive which has entered the chamber 229 through the check valve 231. The check valve is used so that under any condition, the high pressure pumped fluid cannot exit back into the additive.

The diffuser portion 235 converts the high velocity mixture into a high pressure mixture by means of the conservation of energy whereby the kinetic energy due to the high velocity is converted into static energy at the corresponding high pressure due to the lowering of the velocity. This is accomplished by an increase of area compared to the nozzle at point 227, the larger area being at the diffuser exhaust 237. Since ejector 220 is shown as 2-stage ejector, the second stage commences at the diffuser exit 237 of the first stage. More high pressure fluid is ejected through the primary nozzles of the second stage 239 from high pressure passage 241, which connects to the high pressure passage 165 to 243. The primary fluid of the second stage further accelerates the mixture exiting at 237 to 245 with a total mixture of both the first and second stage primary fluid plus additive is diffused in a diffuser 247 to the high exhaust pressure which leaves the manifold at 181. The purpose of the ejector is to "suck" in an additive, pressurize it, mix it and at high pressure utilize for spraying purposes downstream of 181.

FIG. 10 is similar to FIG. 9 with respect to the manifold, throttle control, and ejector pump functions. However, the pressure actuating mechanism, even though it employs the same mechanical parts and actuates the by-pass valve as previously described, is different in its mode of operation. The difference, which essentially is a release mode is now described.

The pressure of the fluid is passage 165 exerts a force on piston 14. In the various of the parts as illustrated in FIG. 10, it can be seen that piston 14 is locked into sleeve 183 by virtue of the balls 24 being contained by the insert 44 so that as the piston 14 moves to the right, by forces created by fluid pressure contained in the passage 165, it moves the sleeve 183 against high pressure set-point spring 253. This motion continues until the balls 24 contained by sleeve 183 reach the recess 6 of insert 44 in which the position the balls move into the recess 6 and therefore lock the sleeve 183 to the body of the manifold 166 because the insert 44 is held solidly into the manifold block 166.

As the balls reach the recess 6 and sleeve 183 snaps towards the right to its final position, actuator pin 186 being moved to the right thus pushing ball 185 off its seat contained in part 187. The complete operation for by-pass valve 160 is fully explained in FIG. 9. The "open" mode of this mechanism in by-pass valve is shown in FIG. 11 and is further described with reference to FIG. 11.

Once the balls 24 have moved into the recess 6, piston 14 is disengaged from the sleeve 183 by virtue of the fact that balls 24 have receded into said recess 6 and piston 14 is free to continue its movement towards the right biased by the low pressure set-point spring 225. The piston 14 moves to the right position until it bottoms out against sleeve 183 at 257. Piston 14 will remain in the position as shown in FIG. 11 until the pressure in the passage decreases to the level whereby the low pressure set-point spring 255 moves piston 14 towards to the left. As long as piston 14 is in the position as a shown in FIG. 11, sleeve 183 is locked in the open or right-most position because the diameter of the piston 14 will maintain the balls 24 in such a position as to secure the sleeve 183 to the insert 44 which is firmly attached to the manifold block 166 by insert sleeve 259, the latter held into the manifold block by a retaining nut 261. As the pressure decreases, piston 14 is pushed towards the left by the spring 255 until such a position that the balls 24 can move into recess 22 machined in the piston 14. At this position, the sleeve will unlock from the insert 44 and snap closed or towards the left as previously illustrated in FIG. 10, thus completing the open and closed or activated-deactivation of by-pass valve 160.

To recapitulate, somewhat, in all of the previous figures except as explained in FIGS. 4 and 5 (which is the double latching mechanism) the latching device remains closed until piston 14 has sufficiently moved to de-latch the sleeve from the body. At this time the device actuates whereupon it tends to "creep" shut. In FIGS. 10 and 11 the latching device tends to creep open until latching whereupon at the low pressure set-point and corresponding movement of piston 14, it snaps close. It is obvious that the double latching device described in FIGS. 4 and 5 both "snap" open and close.

Although a number of alternate arrangements features and uses of systems and methods in accordance with this invention have been shown and suggested, it will appreciated that the invention is not limited thereto but encompasses all modifications and variations falling within the scope of the appended claims.

What is claimed is:

1. A force operated latching device for controlling operation of a device having a movable element controlling operation thereof to effect actuation and deactivation thereof at different force levels comprising:
   a supporting body having a recess provided therein,
   a sleeve including a stem positioned in said recess for movement therein,
   a piston including an end face positioned within said sleeve and movable therein in response to a change in force from one position to another,
   means in said body transmitting force against the end face of said piston,
   spring biasing means positioned within said sleeve and urging said piston in one direction in response to force at a first predetermined level,
   said body including an annular recess located radially of said piston and spaced axially from said spring biasing means,
   said piston including a recess therein,
   said sleeve including means cooperating with the annular recess in said body and the recess in said piston to lock the sleeve to the body in one position of the piston and to lock the sleeve to the piston in another position of said piston, and spring means cooperating with said sleeve to urge said sleeve and said piston in another direction in response to force at a second predetermined level whereby said piston is unlocked from said sleeve and said sleeve is locked to said body.

2. A force operated latching device as set forth in claim 1 wherein said cooperating means on said sleeve includes
   a plurality of apertures therein, sphere means received in said apertures, and
   said sphere means being movable radially to lock and unlock said sleeve.

3. A force operated latching device as set forth in claim 1 further including an electrical switch means operated by said stem.

4. A force operated latching device as set forth in claim 1 wherein said sleeve includes means to adjust the force of said spring biasing means within said sleeve.

5. A force operated latching device as set forth in claim 1 wherein said supporting body includes a fluid inlet and a fluid outlet, and
   valve means located in said body and moveable from one position to another by said sleeve means to permit and to stop flow of fluid from said fluid inlet to said outlet means.

6. A force operated latching device as set forth in claim 1 further including
   a second annular recess in said body,
   said piston including a second recess therein, and
   said sleeve including second means cooperating with said second annular recess and said second recess in said piston to lock said sleeve to the body in each position thereof and to unlock said sleeve from said body in response
   to a change in said force.

7. A force operated latching device as set forth in claim 1 wherein said force is fluid pressure.

8. A force operated latching device as set forth in claim 1 for use with an internal combustion engine for controlling the throttle thereof and wherein said supporting body is a manifold body,
   said manifold body including inlet means receiving fluid,
   passage means for flow of fluid from said inlet to said end face of said piston,
   check valve means in said passage permitting flow of fluid to the end face of said piston,
   by-pass valve means operated by said check valve means,
   said by-pass valve means including an inlet and an outlet,
   throttle control means,
   means interconnecting said manifold inlet means and said by-pass valve means inlet means, and
   said throttle control means including means movable in response to closing of said by-pass valve means to effect movement of said throttle control means.

9. A force operated latching device as set forth in claim 8 wherein said manifold includes ejector means therein,
   means to flow fluid from said check valve means into said ejector means,
   means in said manifold forming an additive inlet means cooperating with said ejector means, and
   means in said manifold cooperating with said ejector means for flow of fluid and additive from said additive inlet means out of said manifold.

10. A force operated latching device as set forth in claim 8 wherein said sleeve remains stationary until said piston has moved sufficiently to release the sleeve from said body.

11. A force operated latching mechanism as set forth in claim 8 wherein said sleeve moves as said piston moves and remains locked to said piston until the force on said piston drops to effect locking of said sleeve to said body.

* * * * *